Sept. 13, 1927.

C. SMITH ET AL 1,642,218

TWISTING MACHINERY

Filed Feb. 4, 1927

INVENTORS:
Charles Smith
Fred Yorke
BY
ATTORNEYS.

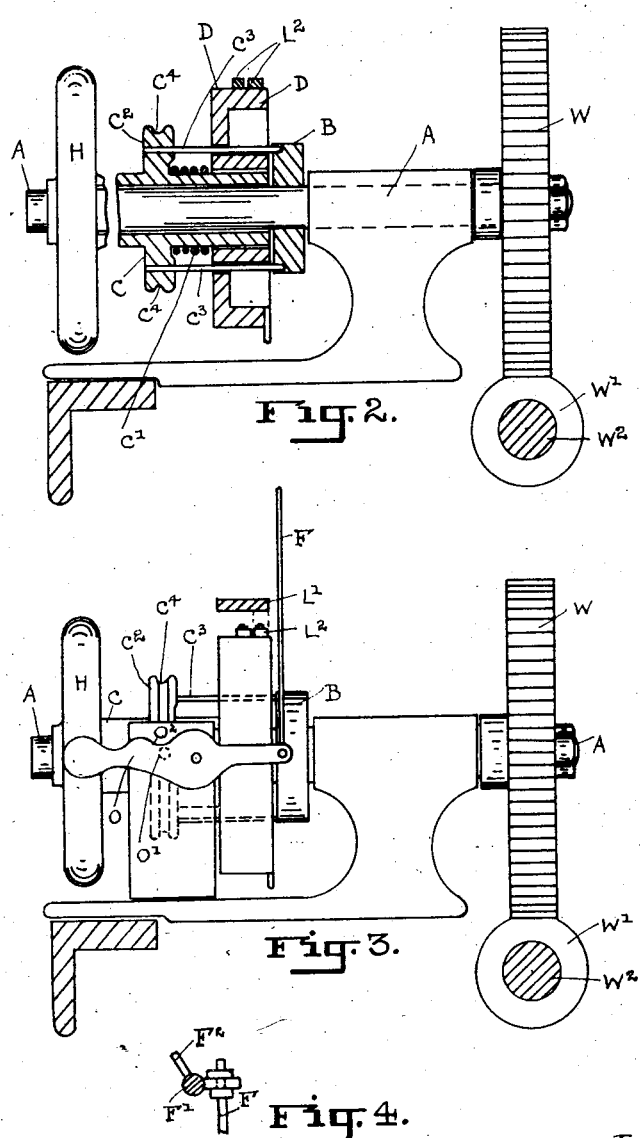

Patented Sept. 13, 1927.

1,642,218

UNITED STATES PATENT OFFICE.

CHARLES SMITH AND FRED YORKE, OF BRADFORD, ENGLAND.

TWISTING MACHINERY.

Application filed February 4, 1927, Serial No. 165,821, and in Great Britain February 18, 1926.

This invention relates to improvements in twisting machinery and refers more particularly to means and apparatus connected with the doffing of either cap or ring twister frames, of that class wherein the spindles are divided into groups, and each group may be doffed independently of the others without necessitating the stoppage of the machine.

That is to say each group of spindles will have its own control means and each and all control means will operate in connection with a common lifter motion of suitable or usual form, the said means being so arranged and operated that when the bobbins or spools on one group of spindles are filled the control means will be operated and the ends broken. Doffing may then take place, and the mechanism re-set all without stopping the remaining spindle or group of spindles. This arrangement permits the twisters to continue their work and does not necessitate the stoppage of a frame for considerable periods as is now the usual case.

According to our invention each group of spindles is provided with its own control mechanism in the nature of a drum to which the lifter chains or like are connected with jockey or like pulleys interposed. The drum is provided with a clutch device and carries a clutch relieving device. When the clutch is in gear a slow motion is given to the drum from a suitable source of power connected say to the lifter mechanism.

When the drum has turned a predetermined distance a catch thereon will knock off the clutch engaging mechanism and the drum will cease its movement.

In connection with the knock off motion a link lever or the like will connect to a shaft carrying forks or fingers one for each spindle, which will drop and break ends and thus stop the feed to the bobbins and spools. It being understood that the usual trap or knock off motion employed with twisting frames will be used to prevent laps and waste.

After doffing the operator re-sets the clutch mechanism by a suitable handle and twisting continues on that section.

Generally the spindles will continue to be driven but in some forms we may find it desirable to hold or stop the bobbins or spools.

Referring to the drawings which form part of this specification

Fig. 2 represents a sectional elevation shewing clutch mechanism referred to.

Fig. 3 represents a side elevation of the mechanism and

Fig. 4 represents a detail hereinafter referred to.

Figure 1:
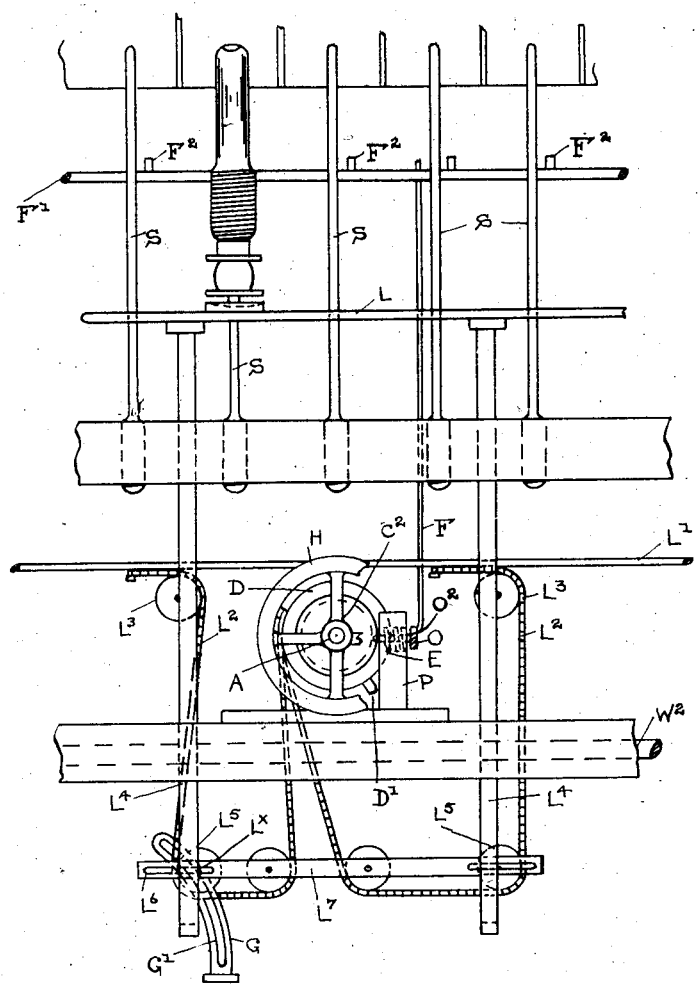
Fig. 1 represents a front view of a group of spindles fitted with our apparatus.

To carry our invention into effect, in the first place each group of spindles S will have its own lifter rail L operated substantially in the usual manner from a lifter mechanism which may comprise a heart cam operating between guides carried by a horizontally moving bar $L'$ from which chain or like connections $L^2$ lead over pulleys $L^3$ to the feet of the lifting bars $L^4$.

The chains or the like $L^2$ pass under what we may term jockey pulleys $L^5$ suitable carried in connection with the lifting bars $L^4$ and their outer ends lead up to and connect with a drum D loosely mounted around a spring acting clutch member C, which is in turn loosely and slidably mounted around a suitable shaft A. This shaft A carries a driving wheel B (Fig. 2) adjacent to the drum, and to the rear a worm wheel W driven by a worm $W'$ carried by a shaft $W^2$ operated at a slow speed through suitable gearing in connection with the lifter mechanism, all so arranged that a change of speed may be operated.

The clutch member C is separated from the drum D by a spring or springs $C'$ Fig. 2 and carries an outer disc $C^2$ to which a suitable handle or wheel H is connected. The clutch disc $C^2$ carries a series of fingers or pins $C^3$ which pass through apertures in the drum D and engage apertures, notches, or the like, in the driving wheel B, when the springs are compressed. To hold the clutch disc $C^2$ in the in position a catch is necessary and to this end a pillar or like P carries a sliding spring stud E adapted to be pressed into contact with a race, groove, or the like $C^4$ in the edge of the disc portions $C^2$, or to engage in catch members or the like. The spring catch E is retained in the in position by means of a pivoted lever or plate O having a cam or inclined face $O'$ and gap $O^2$ to press the catch in and to aid in quick release.

An adjustable stop $D'$ mounted on the drum D is arranged to contact with the pivoted lever and turn aside at a predetermined time. This releases the spring catch E from the disc C² and allows the clutch to move outwards and disengage the fingers C³ from the wheel B and the drum ceases to be driven. At the same time a lever or link F connected to the pivoted lever O is operated and this lever connects to a shaft F' (Fig. 4) carrying yarn severing devices, fingers, or the like F², each for one spindle. The severing devices or fingers F² move towards either the caps or travellers in the path of the yarn and trap and sever the same. The usual knock off motion provided on the machine above and arranged in connection with the ends for preventing laps and waste and continued feed is utilized; doffing may now take place, the other groups not being interfered with. After doffing the clutch member is re-engaged with the drum D and the driving wheel B by pushing the pins or like C³ into engagement with the wheel B, and the pivoted lever O moved to press the spring catch to hold the clutch in position and the drum is driven until the next doff and so on.

To aid in correct building of the yarn on the bobbin or tube at the commencement of twisting, we prefer to provide for one of the pulleys L⁵, guides G carried from the floor, these guides G have slots G' therein curved slightly for the pins or pivot Lˣ of the wheels L⁵, to move in, and at the same time slots L⁶ are provided in the wheel supporting bar or frame L⁷ to allow the wheels to move horizontally, only one of these devices is shewn in Fig. I.

What we claim is:—

1. Building motion means for twisting and like machines, wherein the spindles are divided into groups, each group with its own lifter rail, comprising in combination a common lifter operating rail connected by chains or the like to a slowly revolving drum for each group, said revolving drum being operated by a continuously revolving shaft, and interposed clutch mechanism which is freed on the filling of the bobbins or the like through the medium of an adjustable stop on the drum, which contacts with a guard lever and frees same from contact with a member adapted to hold the clutch in gear.

2. Building motion of the class described comprising in combination a transverse moving common lifter operating rail connected by chains or the like to a slowly revolving drum for each group, said drum being operated by a continuously revolving shaft, and interposed clutch mechanism which is freed on the filling of the bobbins through the medium of an adjustable stop on the drum which contacts with a lever and frees same from contact with a member adapted to hold the clutch in gear, said lever being connected to yarn severing means.

3. Building motion of the class described comprising in combination a common lifter operating rail, connected by chains passing over and under pulleys to a slowly revolving drum, the lower pulleys being movable in their bearings, the revolving drum being driven by a clutch member, operated by a continuously moving shaft, the drum being freed on the filling of the bobbins by means of an adjustable arm on the drum contacting with a lever which in normal operation serves to retain a member in engagement with the clutch to hold same in gear, which when tripped releases the clutch holding gear and permits the clutch member to force itself by spring action from the driving gear.

4. Building motion of the class described comprising in combination a slowly revolving clutch driven drum connected to the lifter motion, a release lever for the clutch mechanism and means for releasing same; said release lever having a connection to a movable shaft mounted adjacent to the bobbins, which shaft carries yarn severing devices.

In testimony whereof we have signed our names to this specification.

CHARLES SMITH.
FRED YORKE.